US007266558B2

(12) United States Patent
Gray

(10) Patent No.: US 7,266,558 B2
(45) Date of Patent: Sep. 4, 2007

(54) METHOD AND APPARATUS FOR GLOBAL RELIEF MANAGEMENT

(76) Inventor: Michael D. Gray, 2 Wisconsin Cir., Suite 700, Chevy Chase, MD (US) 20815

( * ) Notice: Subject to any disclaimer, the term of this patent is extended or adjusted under 35 U.S.C. 154(b) by 334 days.

(21) Appl. No.: 10/768,114

(22) Filed: Feb. 2, 2004

(65) Prior Publication Data

US 2005/0171952 A1 Aug. 4, 2005

(51) Int. Cl.
*G06F 17/00* (2006.01)
*G06F 19/00* (2006.01)
*G06F 17/30* (2006.01)

(52) U.S. Cl. ................................ 707/10; 707/9; 702/5

(58) Field of Classification Search .................. 707/10, 707/1, 2, 9, 200; 702/5; 711/100; 703/5; 455/457
See application file for complete search history.

(56) References Cited

U.S. PATENT DOCUMENTS

| | | | | |
|---|---|---|---|---|
| 5,628,050 A | | 5/1997 | McGraw et al. | |
| 5,630,209 A | | 5/1997 | Wizgall et al. | |
| 5,815,417 A | * | 9/1998 | Orr et al. | 703/5 |
| 6,023,706 A | * | 2/2000 | Schmuck et al. | 707/200 |
| 6,028,514 A | | 2/2000 | Lemelson et al. | |
| 6,526,275 B1 | | 2/2003 | Calvert | |
| 6,574,561 B2 | * | 6/2003 | Alexander et al. | 702/5 |
| 2002/0069312 A1 | * | 6/2002 | Jones | 711/100 |
| 2004/0192353 A1 | * | 9/2004 | Mason et al. | 455/457 |

OTHER PUBLICATIONS

"Disaster Operations Satellite System—An Approach to Applying Remote Sensing, etc." Lockheed Stennis Operations, Stennis Space Center, MI (no day & month, year).

"Aid for Aid Sets Out on its First Expedition", aidforaid.com, Sep. 10, 2003.

"Disaster Management", D.P. Rao, Dept. of Space, Govt. of India, Mar. 2000.

"Disaster Response, GIS for Public Safety", Gary Amdahl, ESRI Press, Nov. 2002.

* cited by examiner

*Primary Examiner*—Don Wong
*Assistant Examiner*—Hung Tran Vy
(74) *Attorney, Agent, or Firm*—Patton Boggs LLP

(57) ABSTRACT

A system and method includes providing a database having a plurality of damage characterization data and a geographical location associated with each. A first and a second portable communication unit are associated, respectively, with a first subscribing party and a second subscribing party. A sharing privilege list identifies, for the first subscribing party, parties authorized to receive damage assessment data. A damage assessment report is transmitted from the first of the portable communication units to the database. The database is updated based on the damage assessment report. Then, depending on whether or not the second subscribing party is on the sharing privilege list, a data is communicated to the second of the portable communication units reflecting, or based on, the damage assessment report.

5 Claims, 8 Drawing Sheets

METHOD AND APPARATUS FOR GLOBAL RELIEF MANAGEMENT

BACKGROUND OF THE INVENTION

The present invention is directed to a system for managing field level evaluation and relief efforts and, more particularly, to a system for inputting, characterizing, managing and distributing information for the provision of humanitarian relief over large and remote geographical areas.

RELATED ART

A primary objective of organizations, agencies and other entities providing humanitarian relief (collectively referenced as "relief agencies") is to provide immediate, necessary relief to victims of humanitarian crises arising from, for example, natural disasters such as floods, earthquakes, hurricanes and man-made disasters such as war. The destruction in such situations can involve dwellings, agricultural systems, health-care systems, sanitation, transportation, water and power systems. The crises further include the human risks facing displaced populations occupying regions themselves having inadequate supporting infrastructure. Frequently, because of the scale of the destruction, and the stricken area's requirement for immediate receipt of a range of necessities, several relief agencies respond. The several agencies may provide concurrent relief assistance, and/or different agencies may provide different assistance at respective stages of the overall relief effort. The agencies must have, and be able to distribute, accurate, real-time information describing the situation.

In a typical present relief effort, such as that provided to a populated area after experiencing a high-magnitude earthquake, a plurality of relief agencies responds. The agencies may be international organizations (IG), government organizations, (GO), and non-government organizations (NGOs). Each agency typically begins its relief effort by sending in a number of its field personnel. The initial mission of the field personnel is to obtain damage assessment reports for their respective agency. The field personnel typically generate the damage assessment reports by traveling to a damage site and writing down unformatted personal observations on the site's geography, a general summary of the population and developmental condition of the area prior to the disaster, if that information is available, and an inventory or estimate of the damage. For example, the field person might write in a notebook that a village named X had an estimated pre-damage population of two thousand, the population occupying approximately five hundred mud-brick homes, and that they had a local power generating station, and a local water supply. The field person would then write an estimate/inventory of the damage. The write-up information would include, in an unformatted manner, that approximately 100 mud-brick homes were still standing, about 200 were damaged but had the majority of their outer walls reasonably intact, and that the remainder were destroyed. It would further an estimate of injuries, by number and type of injuries, and the deaths, including the locations and retrievability of the bodies. Other information would be, for example, the field person's observation on the local water supply, including the reservoir, or the wells, and the filtering facilities and distribution system, and assessments of the electrical power system, and other systems of the local economy.

After writing the information, the field person would typically type a report and e-mail or fax it to the agency. The agency would then, based on the information, estimate the relief it could provide.

SUMMARY OF THE INVENTION

An example embodiment of the present system and method includes providing a database having a plurality of damage characterization data and a geographical location associated with each. A plurality of portable communication units are provided, each having a display, a manual data entry mechanism, and a geolocation detector for generating a geolocation data based on an externally generated geolocation signal. A first of the portable communication units is associated with a first subscribing party and a second of the portable communication units is associated with a second subscribing party. A sharing privilege list identifies, for the first subscribing party, at least one other subscribing party authorized to receive damage assessment data from the first subscriber. A geolocation data is generated at the first of the portable communication units based on its geolocation. A damage assessment data is input, by the user, into the first of the portable communication units. When entry of the damage assessment data is completed a damage assessment report is transmitted from the first of the portable communication units to the database, the damage assessment report including data reflecting a damage assessment data, an identification data identifying the sender of the damage assessment report, and the geolocation data. In response, the database is updated based on the damage assessment report. Then, depending on whether or not the second subscribing party is on the sharing privilege list, a data is communicated to the second of the portable communication units reflecting, or based on, the damage assessment report.

In a further embodiment, a plurality of subscribing party headquarter communication units is provided. A first of the subscribing party headquarter communication units is associated with the first subscribing party and a second of the subscribing party headquarter communication units with the second subscribing party. Depending on whether or not the second subscribing party is on the sharing privilege list, at least one data reflecting the damage assessment report is communicated to the second of the subscribing party headquarter communication units.

These and other objects, features and advantages of the present system will become more apparent to, and better understood by, those skilled in the relevant art from the following more detailed description of the preferred embodiments, taken with reference to the accompanying drawings, in which like features are identified by like reference numerals.

DETAILED DESCRIPTION OF THE INVENTION

Overview

Figure 1:
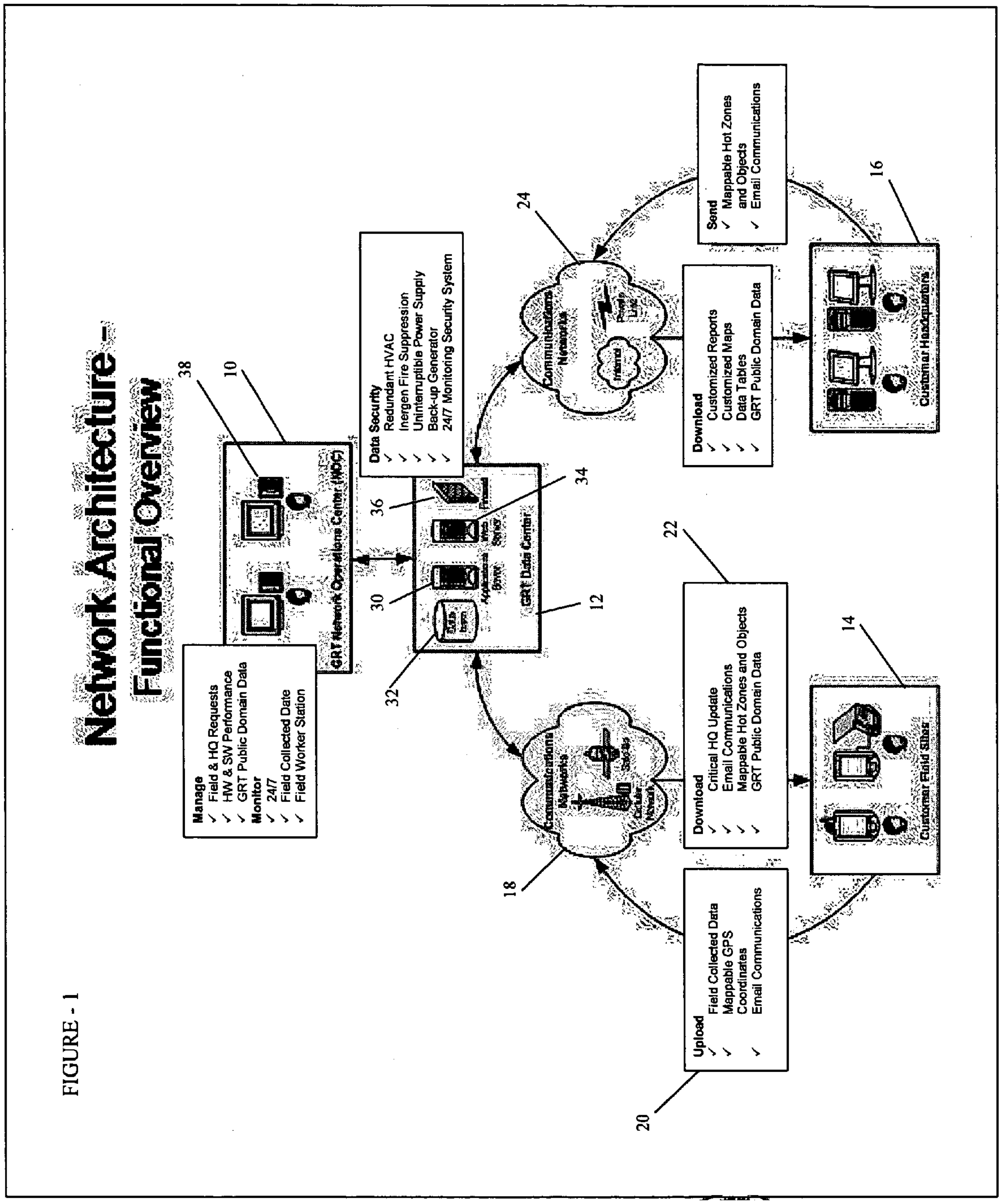
FIG. 1 is an example high level block diagram of an example embodiment of the described system.

For purposes of this description, the term "relief agency" encompasses all of the phrase's ordinary and customary meanings including, but not limited to, government, non-government, and international organizations and other entities that assess damage wrought by natural forces, such as hurricanes, typhoons, earthquakes, and the damages wrought by man-made forces such as war and insurrection.

The described system is an end-to-end service through which field personnel inspect and collect information from disaster areas, the information is organized as a selectable privilege-based user-accessible database, and the information is distributed among, through default and user-selectable formats, and between disaster relief agencies, and other users through privilege-based access.

An example of the described system includes a central information distribution and management center, one or more agency headquarter centers, and a plurality of field units, which are portable communication devices carried by or mounted to the vehicles of field personnel.

A typical system further includes a wide-area communication network such as, for example, the Internet, and other described networks for communication among and between the field units, the central information management center, and the one or more relief agency headquarter centers.

In the described embodiments, the field units operate within, and have circuitry for utilizing, a geo-positioning system such as, for example, the Global Positioning System (GPS). Utilization of geo-positioning system is preferred because, as will be described, the field unit's geo-location is included in the evaluation reports that the units deliver via uplink to the central information management center.

The field units display graphical user interface (GUI) forms to the user for entry of damage assessment information and for uploading the information as a damage assessment report. The forms are typically stored in the field units, and are typically customized for the particular relief agency associated with the field person possessing the field unit. Updating of the forms by downlink from the central information management center is contemplated. The damage assessment reports include the geolocation of the sending field unit and a data, or other information, identifying the relief agency associated with the sender. The central information management center has distribution privilege data that typically maintains, for each relief agency, a list of other agencies, if any, to which the sending agency's damage assessment report information may be distributed. The distribution privilege data may specify the distribution more particularly, such as certain types of information being distributed to certain other agencies.

The field units also display real-time maps to the user, a typical map utilizing geographical map data stored in the field unit on which updated situation information, received by downlink from the central information management center, is overlaid and displayed.

DETAILED DESCRIPTION

The following description includes numerous example details and specifics, some of which pertain only to the specific examples presented, and which are included only to assist in describing these specific examples, and thus assist the reader in understanding the features and elements of the described system. It will be evident to ones skilled in the art that the described systems and methods can be practiced without, and with different ones of, these details and specifics.

This description assumes the reader to have ordinary skill in the relevant arts of wide-area networks (WAN) such as, for example, the Internet, virtual private networks (VPN) employing public channels, local area networks (LAN), commercially available database software and hardware systems, and the interface protocols for users to access same, available satellite telephone systems, cellular telephone systems, and personal computers and hand-held computing devices. Details for implementing the described systems and methods, to the extent such details are knowledge possessed by persons of skill in the above-listed arts, by which such persons after reading this description can select from among, configure and assemble commercial components into the described systems, are omitted.

Figure 2:
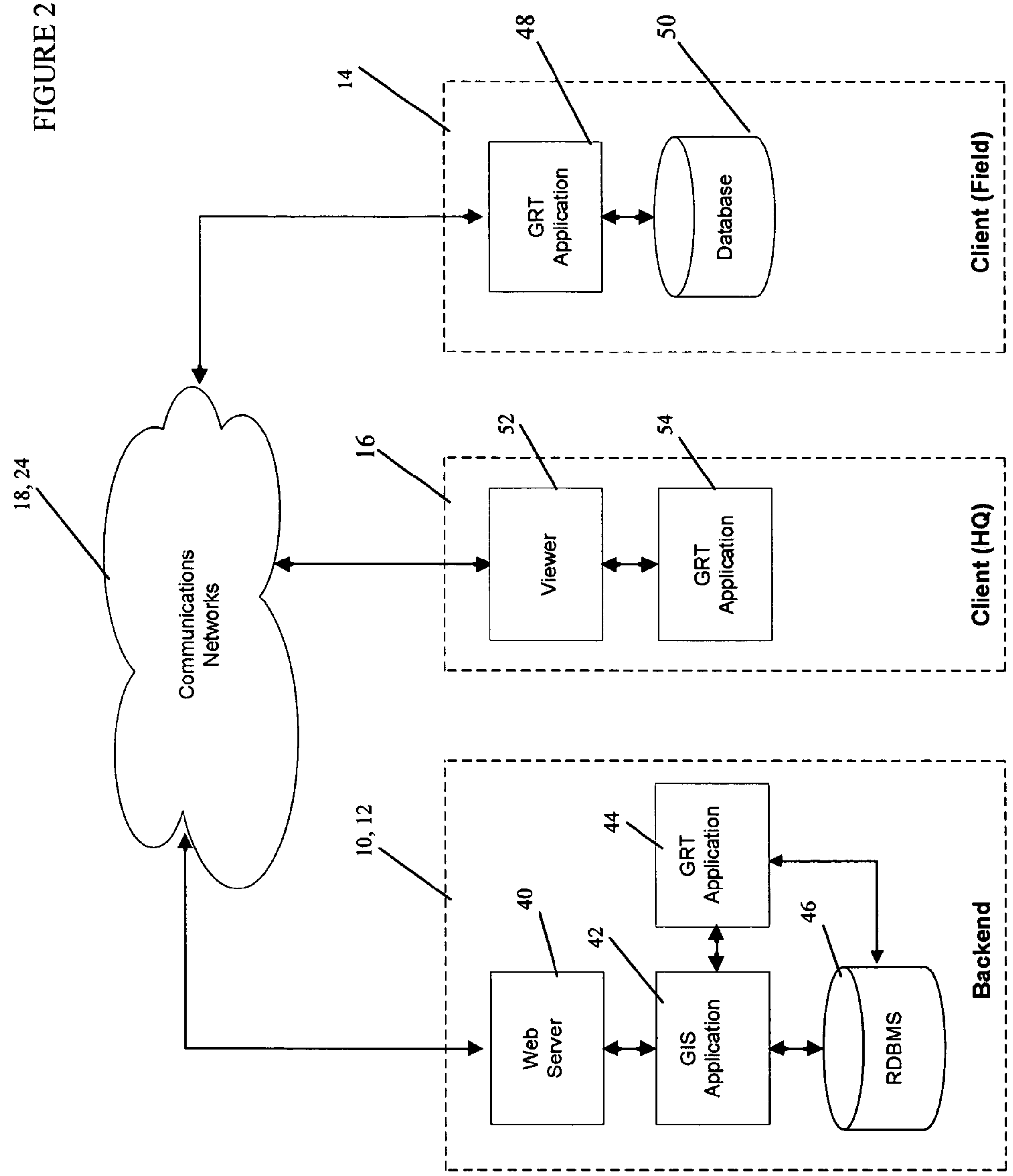
FIG. 2 is an example high level system-level software architecture supporting the FIG. 1 system.

FIG. 1 shows a high-level functional block diagram of an example embodiment of the system. FIG. 2 is an example system-level software architectural chart for the software supporting, and implemented on, the FIG. 1 system. It will be understood that FIG. 1 is a graphic representation of an example and is arranged according to functional blocks. The depicted block segmentation and arrangement is selected to assist in the understanding of functions and operational features of the described system. The depicted blocks do not necessarily represent, or limit, the physical hardware blocks, or subsystems, for implementing a system in accordance with this description. For example, as will be further understood from this detailed description, various functional blocks of the FIG. 1 example diagram may be implemented on a distributed arrangement of, for example, mass storage units and servers. Likewise, a single interconnected system of mass storage units, servers and user interface devices may perform the functions represented by a plurality of FIG. 1 functional blocks. Still further, the particular FIG. 1 segmentation of functional blocks, and the labeling of the blocks, is for purposes of example only, and is not a limitation on the scope of the particular architectures, communication and database structures that may be used for implementing the described system.

Referring to FIG. 1, the depicted example system includes a network operations center 10, which is referenced hereinafter as the GRT network operations center 10, its associated GRT data center 12, a plurality of customer field sites 14, and one or more customer headquarter centers 16. A field unit communication network 18 provides for uploading communications from the plurality of customer field sites 14 to the GRT data center 12 and for downloading communications from the GRT data center to the plurality of customer field sites 14. The uploading function of the wireless communication network 18 is represented, along with an example list of specific uploading communications, as block 20. Likewise, the downloading function, with an example list of download operations, is represented as block 22. A WAN 24 provides for communications between the one or more customer headquarter centers 16 and the GRT data center 12. The uploading function of the wide area network 24 is represented, together with an example list of specific uploading communications, as block 26. Similarly, the downloading function of the wide area network, with an example list of download operations, is represented as block 28.

With continuing reference to FIG. 1, an example customer field site 14 is a portable computing device, preferably ruggedized, such as, for example, a Panasonic Toughbook™, a Howard Portall Workbook™, or any of the equivalents available from various commercial vendors. The customer field site 14 includes a wireless communication feature, of a type dependent on the implementation of the field unit communication network 18 in which the unit 14 is operating. Examples off-the-shelf wireless communication devices are an INMARSAT GAN and an INMARSAT Mini-M, which are readily attached to commercially available portable computing devices, such as the Panasonic Toughbook™ and other off-the-shelf examples of the field site 14 identified herein. The customer field site 14 further includes a GPS receiver, or an interface to an external GPS receiver. An example GPS receiver, which connects to the Panasonic Toughbook™ and to equivalent laptop computers, is the Trip-Nav™ model TN 200 GPS receiver with Universal Serial Bus (USB) connectivity.

Another example implementation of a field unit 14 is a hand-held computing device such as, for example, a Dell™ Axim™ X5 or X3i, preferably ruggedized with a commercially available environment casing, or "skin", or an equivalent hand-held such as the Symbol Technologies™ model SPT-1800™ or model PPT-2800™, the hand-held computing device, having a GPS receiver such as, for example, a LinksPoint™ GlobalPoint™ GPS, or a Pharos™ model PFD22™ GPS receiver, and having, for example, an INMARSAT Mini-M Satellite Phone. These particular make/model of ruggedized laptops and ruggedized handheld computing devices, and their respective GPS receivers, are only for purposes of example. Persons of skill in the relevant arts can, upon reading the present description, readily identify equivalent kinds and models of off-the-shelf devices available from various commercial vendors.

Referring again to FIG. 1, an example implementation of the GRT network operations center 10 and its associated GRT data center 12 is the date center 12 including one or more commercially available application servers 30, a GRT database 32, a web server 34, and an optional firewall 36, and the GRT network operations center 10 including a plurality of user terminals 38. It should be understood that the GRT network operations center 10, the GRT data center 12 and the customer headquarter centers 16, are functional blocks, and each is not necessarily a single brick-and-mortar facility. Further, the GRT network operations center 10 and the GRT data center 12 are functional blocks, and are not necessarily implemented on hardware systems separate from one another. Accordingly, the terminals 38 may be co-located with one another and with the computer hardware of the GRT data center 12, or may be distributed over a wide geographic area.

The described components of the GRT network operations center 10 and the GRT database 12, to the extent they are implemented on, or reside in separate hardware units are connected to one another using, for example, a LAN. The LAN connection, though, is only an example because, as stated above, one or more of the functions of the GRT network operations center 10 and the GRT database 12 can be implemented on distributed hardware systems. For example, the GRT database 32 may be a distributed cluster of server-controlled mass storage devices, interconnected by, for example a virtual private network (VPN) carried over the Internet. Construction, operation and maintenance of distributed cluster databases is known to persons of ordinary skill in the arts pertaining to this described system.

An example implementation of the FIG. 1 application server 30 of the GRT network center 10 is a Dell PowerEdge™ server or a Sun SunFire™ server, running under a standard commercially available operating system. An example implementation of the database 32 is a Dell PowerVault™ Storage Unit. The identified examples of makes and models of the server 30 and the database 32 are only for purposes of illustration. Many alternative commercially available implementations can be chosen from, and the selection from these is a design choice based on conventional selection criteria known to persons of ordinary skill in the computer arts. Examples of such selection criteria, which are known, include, for example, the number of users, size of the database, desired access time, and desired security.

With continuing reference to FIG. 1, the GRT terminals 38 may be, for example, conventional personal computers or may be what is termed in the pertinent arts as an "ultra-thin client" having only a data input/output device and a visual display device.

With continuing reference to FIG. 1, various implementations of the field unit communication network 18 are contemplated. A typical preferred embodiment is a satellite phone system such as, for example, INMARSAT, because satellite phones provide excellent coverage, to even the most remote areas, and do not require a local communications infrastructure. Another contemplated embodiment is a cellular-type network, at least for the portion of the communication network 18 to which the field unit 14 interfaces. With respect to bandwidth requirements, it will be understood from the further detailed description of the present methods and their example operations that the bandwidth requirements of the field unit communication network 18, at least for the preferred embodiments, are not particularly high. Reasons for the typical bandwidth requirements being not high include the anticipated size of the disaster evaluation files, termed ASSESSMENT files and the transmitted DAMAGE ASSESSMENT REPORTS containing same, that will be uploaded by the field units 14, and the anticipated refresh or new report rate, and data quantity per refresh or new report, of the geographical information, termed AREA SITUATION GIS reports, that will be communicated from the GRT network operations center 10 to the field units 14.

With continuing reference to FIG. 1, WAN 24, connecting the GRT network operations center 10 and its associated GRT data center 12 to the one or more customer headquarter centers 16 may be implemented on the Internet, or on a combination of the Internet and point-to-point T1 lines, the T1 lines being leased from commercial communications entities as known in the art.

FIG. 2 shows an example system level chart for the software supporting and implemented on the FIG. 1 example system. Dotted line boxes on FIG. 2 that have number labels corresponding to the number labels of functional blocks of FIG. 1 are the software blocks corresponding to that functional block. Referring to FIG. 2, the block labeled "Backend," with reference numbers 10 and 12, represents the software architecture for the GRT network management center 10 and the GRT database 12.

With continuing reference to FIG. 2, within the Backend block is the web server block 40, which is the software associated with the FIG. 1 web server 34. The web server block 40 processes DAMAGE ASSESSMENT REPORTS and other data uploads and requests from the field units 14, as well as access and other requests from the client headquarter centers 16. Example commercial software for implementing these web server 40 functions includes the Java Virtual Machine Servlet engine. The other software blocks in the Backend are the GIS Application block 42, the GRT Application block 44 and Relational Database Management System 46. The GIS Application block 42 creates, distributes and administers, under the control of the GRT Application block 44, GIS services described herein, and the associated integration of data from the field units 14, the GRT database 32, and outside databases. Example commercial software for implementing the GIS Application block 42 includes ArcMS™ and ArcSDE™ from ArcSoft™ Corporation, and equivalent software products from other suppliers such as, for example, ESRI Corp. and Autodesk Corp. The Relational Database Management System block 46 performs the data storage and management functions described herein, and example implementations include the Microsoft SQL Server product. The GRT Application block 44 preferably resides on the FIG. 1 application server 30, and performs the described GRT GIS map and associated data services, including updating the GRT GIS maps in response to DAMAGE ASSESSMENT REPORTS, maintaining different GRT GIS maps for different relief agencies, overseeing the transmission of described reports and alerts to the field units 14, and to relief agencies, and others, associated with the customer headquarter centers 16. Upon reading the present disclosure, persons of ordinary skill in the pertinent arts listed above can readily write the GRT Application block software, using commercially available software languages and development tools.

With continuing reference to FIG. 2, the dotted-line block labeled "Clientside(Field)," having the reference number 14, is a generic representation of the software resident on the field units 14. The FIG. 2 Clientside(Field) block includes the Field GRT Application block 48 and the Field Database block 50. The Field GRT Application block 48 is typically a subset, at least in part, of the GRT Application block 44 of the Backend block. The functions of the Field GRT Application block 48, which are more fully described in reference to FIGS. 4-6, include login operations, overlaying GIS data with stored local maps, and the upload and download operations for connecting to, and receiving situational data and alerts from the network operations center 10 and other FIG. 1 blocks corresponding to the FIG. Backend block containing software blocks 40, 42, 44, and 46. The functions of the Field Database block include storing local geographical maps and damage assessment forms.

Referring again to FIG. 2, the dotted line block labeled "Clientside(HQ)" with the reference numeral 16, includes the Viewer software application block 52 and the Client Headquarter GRT Application block 54. The function of the Viewer block 52 is for the client, such as home office personnel of a relief agency, to be able to view the situational maps downloaded to the agency's field units 14, and the DAMAGE ASSESSMENT REPORTS received from its field units 14. The block 54 is shown as a dotted line because typical embodiments contemplate no significant application software required at the client headquarter centers 16. Instead, the preferred embodiment contemplates the Client Headquarter GRT Application block 54 as an application within the GRT Application block 44 of the FIG. 2 Backend. Accordingly, the Viewer application block 52 can be implemented as, for example, a Microsoft Explorer or equivalent web browser. It can therefore be seen that the client headquarter centers 16 are not limited to brick and mortar facilities. On the contrary, a relief agency can provide certain of its personnel with, for example, laptop computers, and agency proprietary administrative privilege codes allowing the person to connect, from any location having Internet access, and from that location be a client headquarter center 16. Software features for the Backend Web Server application block 40, and the GRT Application block 44 implementing such a "mobile" client headquarter center 16 can be easily written by persons skilled in the listed pertinent arts.

Figure 3:
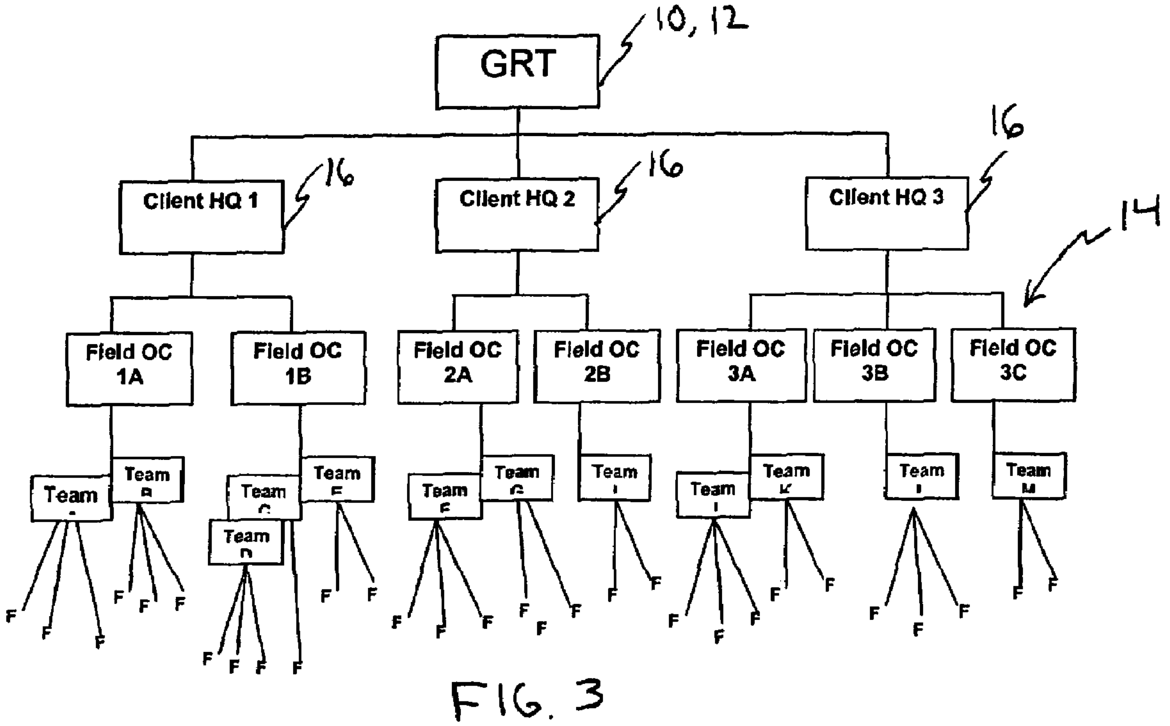
FIG. 3 is an illustrative diagram showing an example functional hierarchy of users of, and nodes within a described system such as that of the FIG. 1 example.

FIG. 3 shows the general privilege hierarchy implemented by the FIG. 1 system and FIG. 2 example software architecture. Table I below presents an example of a further detailed privilege/role definition for the FIG. 1 system and FIG. 2 example software architecture.

TABLE I

| USER/FIG. 1 BLOCK | PRIVILEGES | USER'S ASSIGNED ROLE |
|---|---|---|
| GRT - Network Operations Center 10 | Add, Edit, Delete, Approve (upon client recommendation), View All Client HQ and Field Data | GRT Administrator |
| GRT - Network Operations Center 10 | Sets and administers privileges for all clients 16 | GRT Systems Administrator |
| GRT - Network Operations Center 10 | Views all Client HQ 16 and Field Unit 14 Data | GRT Service Analyst |
| CLIENT HQ - Client HQ 16 | Add, Edit, Delete, Approve and View Own Client HQ 16 Data and View Own Field Unit 14 Data. | Client HQ Administrator |
| CLIENT HQ - Client HQ 16 | View Own Client HQ 16 Data and View Own Field Unit 14 Data. | Client HQ Analyst |
| FIELD HQ - Client HQ 16 | Add, Edit, Delete, Approve and View Own Client Field HQ 16 Data and View Own Field Unit 14 Data. | Field Administrator |
| FIELD HQ - Client HQ 16 | View Own Client Field HQ 16 Data and View Own Field Unit 14 Data. | Field Analyst |
| FIELD WORKER - Field Unit 14 | Add, Edit, Delete, Upload Own reports, View own HQ 16 data view own field data | Field Worker |
| Others, including public | View authorized data open to public or specific other | Public or other |

A method, and examples of its included operations, as performed on a system in accordance with the above-described example system 1, will be described. Referring to FIGS. 1 and 2, the described operations may be performed at the field site 14, by operations of its field database 50 and field GRT Application software block 48. The references to the FIG. 1 depicted example system are not a limitation on the method or its operations. Instead, such references enable a better understanding of the method, by mapping its example operations onto a system having a described architecture. In other words, novel features and aspects of the described method are independent of the example system on which the operation is described.

Figure 4:
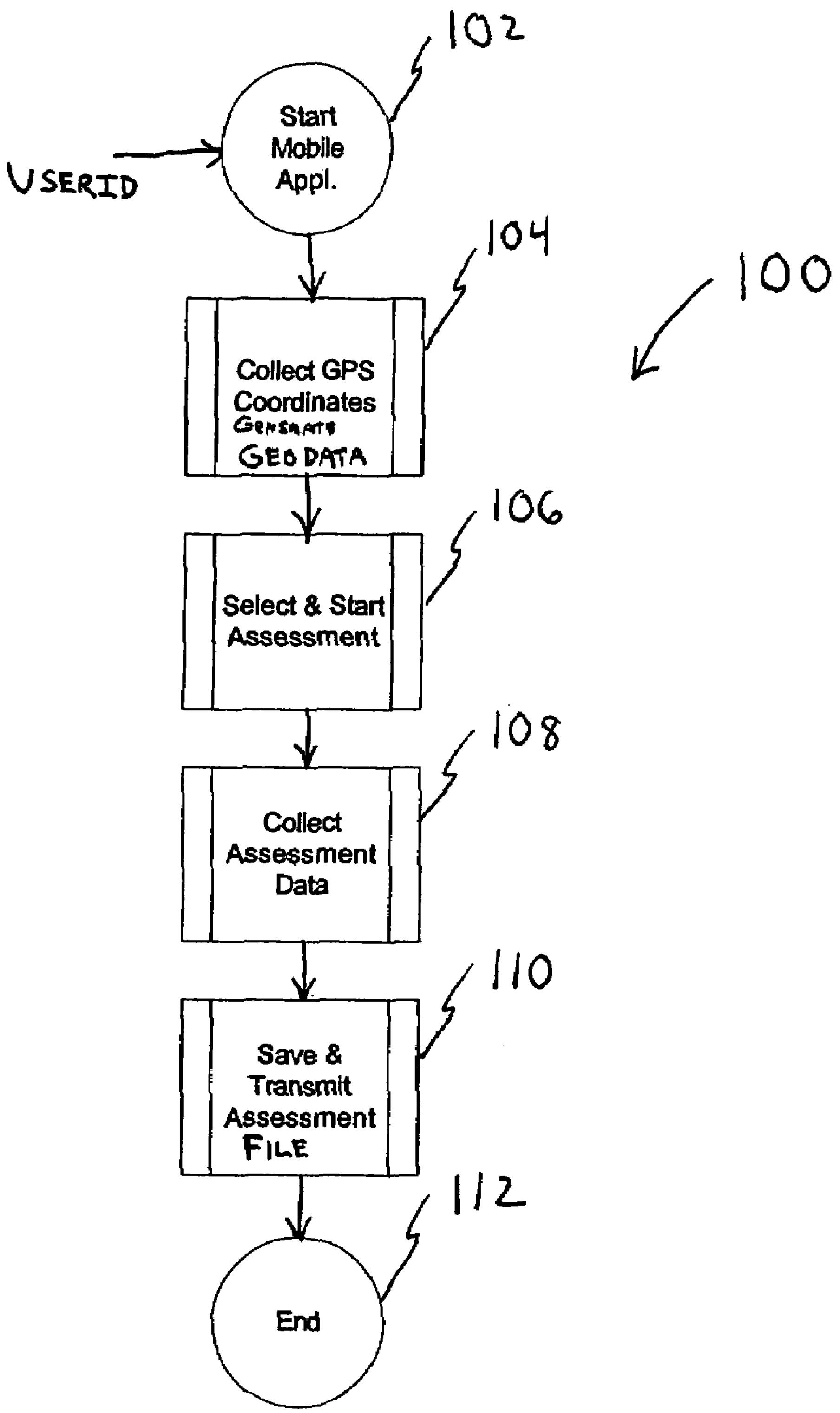
FIG. 4 is an example functional flow chart for a mobile application such as, for example, a damage assessment report uploading.
Figure 5:
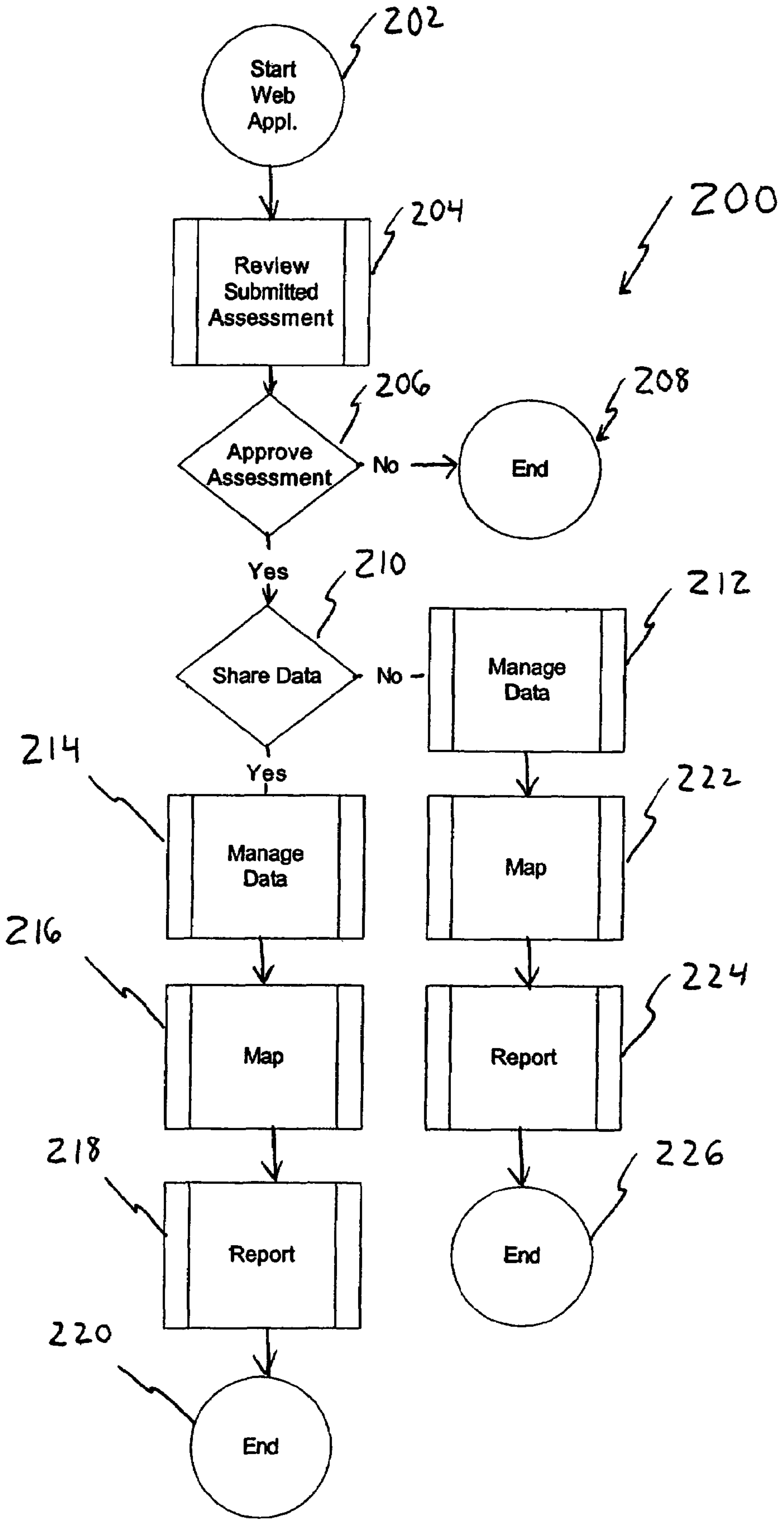
FIG. 5 is an example functional flow chart for web application such as, for example, receiving a damage assessment report from a field unit and, in response, conditionally updating the databases and distributing the information.

FIG. 4 is an example block diagram depiction of what is termed herein as a "mobile application", labeled generally as 100 which, unless otherwise stated, is a mobile user, using for example the customer field site 14 of FIG. 1, collection and uploading of disaster descriptive information. As described, the disaster descriptive information typically quantifies, describes, and/or categorizes the kinds and quantities of disasters and disaster-related damage. FIG. 5 is an example block diagram depiction of what is termed herein as a "web application", labeled generally as 200 which, unless otherwise stated, is an operation performed at, or including, a management center and central database, such as the GRT network operations center 10 and GRT data center 12. As will be described, examples of such web applications 200 are collecting the uploaded disaster descriptive information, which are termed ASSESSMENT files in the examples described herein, updating the central database, and the distribution of all, or portions of the disaster descriptive information to other users and databases, such as the client headquarters 16, and other customer field sites 14.

Referring to FIG. 4, block 102 represents the start of a mobile application 100. An example implementation of block 102 is a user switching on and/or logging into his or her customer field site 14. For block 102 the term "logging in" and "log on" may include interactions with, and gaining access to only the customer field site 14, without establishing a "session", as that term is known in the pertinent arts, with the GRT management center 10. Such log on or logging in operations, including designation and entry of security passwords, are well known in the pertinent arts and, therefore, further description is not necessary. Upon completion of the block 102 start operation, the process goes to block 104 to collect and generate GEODATA, which is geoposition coordinate data such as, for example, that available from GPS.

Figure 6:
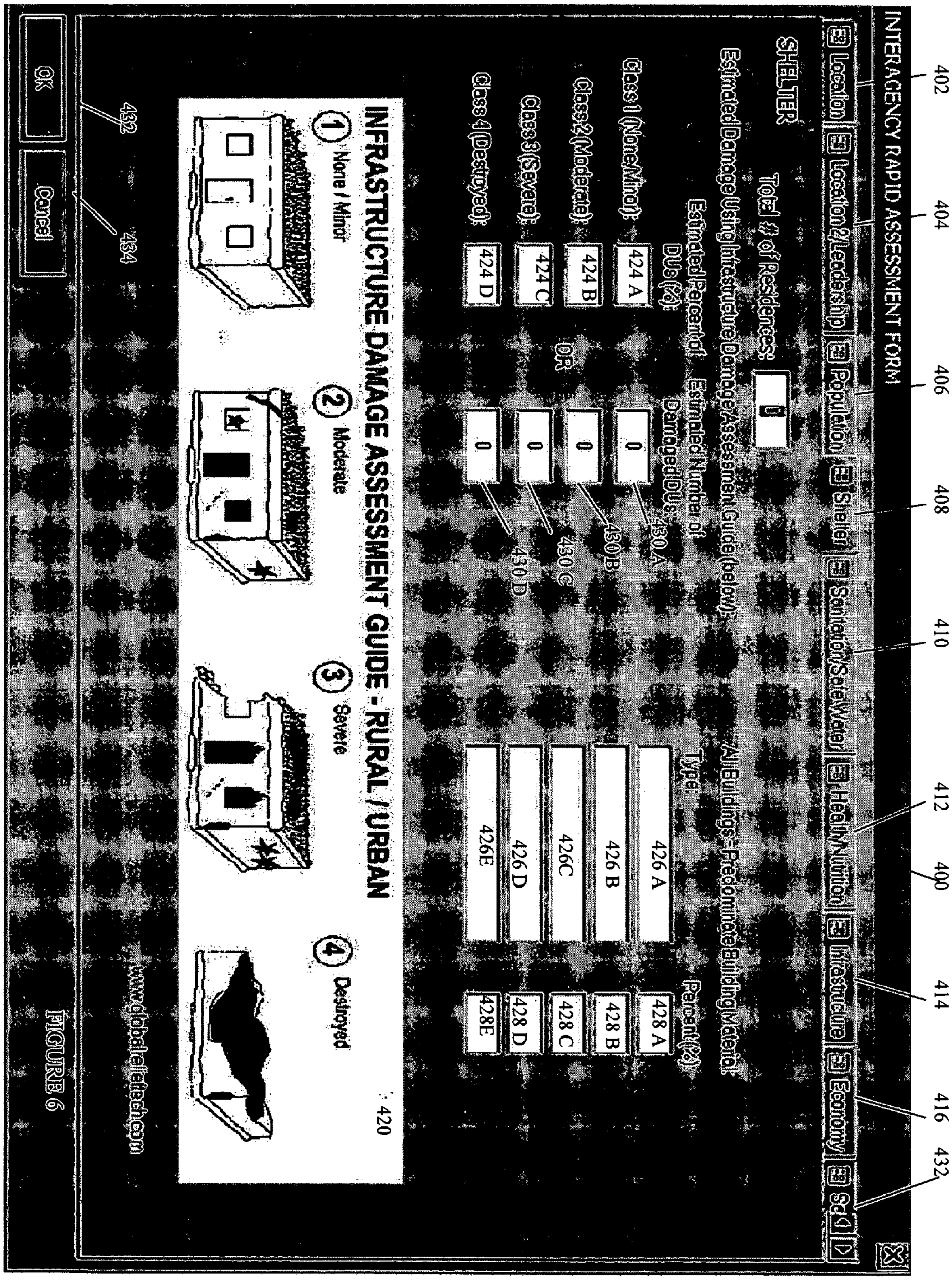
FIG. 6 is an example damage assessment form with user selectable options, displayed on a field unit, for the user to input and upload damage assessment data.

After, or concurrent with collecting geoposition coordinate data at block 104, the process goes to block 106 for selection of one or more types of damage assessment and to start entering observed damage and situational information. FIG. 6 shows an example damage assessment options form 400 presented to the user at block 104, for use in selecting and starting a site assessment. Referring to FIG. 6, the user is presented with a plurality of assessment forms which, for this example are: LOCATION 402, LOCATION/LEADERSHIP 404, POPULATION 406, SHELTER 408, SANITATION/SAFE WATER 410, HEALTH/NUTRITION 412, INFRASTRUCTURE 414, and ECONOMY 416. The FIG. 6 list is only for purposes of example. The number of specific types of damage assessment forms is a design choice. The form that is visible on FIG. 6 is the SHELTER damage assessment form 408.

The FIG. 6 depicted example SHELTER damage assessment form 408 presents the user with a damage level assessment guide 420 showing four levels of damage, labeled 420A, 420B, 420C and 420D, respectively named as "None/Minor," "Moderate," "Severe" 420C and "Destroyed," with an illustrative example of each as a guideline. The FIG. 6 example form 400 assigns numerical values of "1", "2", "3", and "4" to the four levels of damage, to better enable user entry of these damage assessment values into the form 408, as will be described. It will be understood that the particular damage level assessment guide 420 shown by FIG. 6 is only an example. Other names, numerical values and illustrative examples of damage could be used. Further, it is contemplated that the software displaying the SHELTER damage assessment form 408 could include additional guidelines for the damage level assessment guide 420. For example, a "right click," other user operated options selector, when a mouse cursor, or other GUI user-movable pointer, is positioned on a specific example damage type, such as 420B "Moderate," could display an options list allowing the user to select, for example, a longer narrative description. Such "right click" and other types of user-friendly means for accessing user interface options associated with an icon or GUI field are well known in the above-listed pertinent arts.

The FIG. 6 example SHELTER damage assessment form 408 includes the following graphical user interface (GUI) data enter fields: TOTAL # RESIDENCES field 422, ESTIMATED PERCENTAGE DAMAGED UNITS fields 424A, 424B, 424C and 424D, for damage levels "1", "2", "3" and "4", respectively, PREDOMINATE BUILDING MATERIALS fields 426A through 426E, and corresponding BUILDING MATERIAL PERCENTAGE fields 428A through 428E. The FIG. 4 example form 400 also includes ESTIMATED NUMBER DAMAGED UNITS fields 430A through 430D as an alternative to the ESTIMATED PERCENTAGE DAMAGED UNITS fields 424A, 424B, 424C and 424D.

Each of the remaining forms 402, 404, 406, 410, 412, 414, and 416 have a similar arrangement to the visible example SHELTER damage assessment form 408, namely guidelines, buttons, and GUI data entry fields for guiding the user, and effectuating his or her entry of information assessing damage of the type that the form is labeled to collect. The forms 402-416 may also include pull-down lists, sub-forms, and assistance files stored in the displaying device, e.g., the field site 14. Such pull-downs and assistance files are known in the above-listed pertinent arts.

Referring to FIG. 4, at block 106 the user selects an assessment form, such as one of the FIG. 6 damage assessment forms 402-416 by, for example, clicking on the visible top tab and then proceeds to block 108 for collecting damage assessment data. Using the FIG. 6 visible SHELTER damage assessment form 408 as an example, the user proceeds to enter data into the form. Examples are the number of residences at the site of the damage, which the user would enter into the TOTAL # RESIDENCES field 422 and, for each of the damage levels "1", "2", "3", and "4", the corresponding number of the residential, which the user would enter into fields 430A through 430D.

When the user has completed entry of the data for the form 408 he or she reviews the entries. If they are satisfactory, the user clicks on the "OK" button 432, which closes the "window," as the visual display of a form such as 408 is known in the pertinent arts, and stores the entered values. If the entries are not satisfactory, the user either edits the entries or clicks on the CANCEL button 434. The user then either clicks on one of the remaining forms 402, 404, 406, 410, 412, 414 and 416, thereby continuing with block 108, or clicks on the SEND tab 430 to transmit or upload the ASSESSMENT file. If the user clicks on the SEND tab 430 the process goes to block 110, where it saves the ASSESS- MENT file and transmits a DAMAGE ASSESSMENT report, having the ASSESSMENT file, to the management center. For this example, the management center is the GRT network operations center 10. The ASSESSMENT file includes the GEODATE generated at block 104, and a USERID data. The USERID data may be prestored in the user's device, such as the field site 14, or may be entered by the user at the start block 102. Depending on the specific implementation, the ASSESSMENT file may also include AGENCYID data, which represents the relief agency that the user is associated with. As will be understood from the further detailed description, in reference to FIG. 5, of an example web application, the GRT network operations center 10 may use the AGENCYID for routing, and for determining the distribution of the ASSESSMENT file. Similar to the USERID, the AGENCYID may be prestored in the user's device, e.g., the field site 14, or entered by the user during the execution of block 102.

The particular operations for carrying out the transmitting, or uploading, of the ASSESSMENT file depend on the particular implementation of the system. For example, referring to FIG. 1, if the field unit communication network 18 is a satellite phone system, such as INMARSAT, uploading the ASSESSMENT file would typically include the dialing protocol, and formatting the ASSESSMENT file as required by the satellite phone service provided. The uploading may be implemented as an e-mail operation, as satellite phone-based e-mail transmission is known in the art. Software for the uploading operations is typically supplied, off-the-shelf, by the satellite phone service provider.

Referring to FIG. 4, the depicted blocks are only for purposes of example. Many variations and other design choices can be implemented by persons skilled in the above-listed pertinent arts upon reading this disclosure. For example block 110 could be executed, i.e., an ASSESSMENT file transmitted to the GRT network operations center 10 each time the user clicks the OK button 432. Another variation or option is that the damage assessment options form 400, or one or more of the specific damage assessment forms such as 402 through 416, could include a pull-down or other GUI data entry field for entry of a priority code or attribute. In other words, a priority code or attribute could be included whereby the user assigns, by requirement or option, a priority code or attribute to an ASSESSMENT. As will be understood in view of the description in reference to FIG. 5, such a priority or kind attribute could be used for determining the scope of dissemination of the DAMAGE ASSESSMENT.

Another variation or option for the FIG. 4 mobile application is that immediately after block 104 generates the GEODATA specifying the location of the field unit 14, a "here I am" type of notice could be uploaded to the GRT network operations center 12, prior to proceeding to the assessment block 106. Such a field unit location notice could, in turn, be immediately forwarded to the client headquarters 16 of the specific relief agency associated with the sending field unit 14. This will be addressed further in the description referencing FIG. 5 of methods and operations carried by the GRT network communications center 10 and GRT data center 12 upon receipt of an ASSESSMENT file.

A still further variation, is that immediately after the field unit 14 sends a "here I am" type of notice, the GRT network operations center 10 would immediately download information relevant to the user associated with the sending field unit 14. As described more fully in reference to FIG. 5, the information would be based in part on the particular user, as reflected by the USERID, and the relief agency that the user is associated with.

The FIG. 4 method, as described, uses forms stored in the field unit 14. As depicted by FIG. 4, the only communication between the field unit 14 and the GRT network operations center 10 is the uploading of the DAMAGE ASSESSMENT REPORT at block 110. One benefit of this FIG. 4 implementation of uploading damage information is that it typically minimizes bandwidth and channel integrity requirement for the field unit communication network 18. An alternative is to structure the communication, in whole or in part, between the field units 14 and the GRT network operations center 10 clients in a web-type system, with less than the entire set of assessment forms actually stored in the field unit 14. User entry of damage assessments, and uploading of the information from each, could be performed in a web-browser mode, or in a remote dial-in session mode. Bother of these remote user access methods are known in the above-listed pertinent arts. This may be preferred for certain implementations.

Referring to FIG. 6, an example operation of a block flow for a web application 200 utilizing, for this example, a system in accordance with FIG. 1 will be described. Referring to FIGS. 1 and 2, the described operations may be performed at the GRT network operations center 10 and the GRT data center 12, by operations of the Web Server application 40, the GIS Application 42, the GRT Application 44 and the Relational Database Management System 46. Referring to FIG. 6, block 202 represents a start web application that may, for example, be a GRT network operations center 10 receiving a DAMAGE ASSESSMENT REPORT uploaded at block 110 of the FIG. 4 example mobile application 100. The web application 200 then proceeds to block 204, where the DAMAGE ASSESSMENT REPORT is reviewed. The specific operations performed by block 204 are, to a substantial extent, either a design choice or are based on requirements specific to the relief agency associated with the field unit 14 that sent the DAMAGE ASSESSMENT REPORT. The FIG. 6 web application 200 contemplates the review operations at block 204 being a combination of automatic review, for template-type qualification criteria such as, for example, required GUI fields being filled out, and review requiring, or allowing for, human judgment. The block 204 review decision branch is represented as block 206. As shown, if the DAMAGE ASSESSMENT REPORT fails the criteria applied at block 204 the process goes to block 208 and ends.

If the DAMAGE ASSESSMENT REPORT meets the criteria applied at block 204, and there is no manual override, the process goes to block 210, which decides whether the data included in the DAMAGE ASSESSMENT REPORT is shared with agencies other than the agency associated with the field unit 14 that sent the report. The sharing decision or rules are not necessarily global with respect to the entire DAMAGE ASSESSMENT REPORT and, instead, sharing may be different with different parts of the report data. The sharing rules are set by the relief agencies and may, for example, be updated by a web session invoked at an agency's respective client headquarter center 16. It is further contemplated that final implementation of a change to the inter-agency sharing rules may require transmission of the proposed change from the GRT network operations center 10 to the proposed receiving agency and receipt of authorization from that agency.

If block 210 determines the information from the DAMAGE ASSESSMENT REPORT to be not sharable, the process goes to block 212. Blocks 222-226 will be discussed further below. If block 210 determines that the information from the DAMAGE ASSESSMENT REPORT is sharable the process goes to block 214 to incorporate data, or certain fields or portions of the data into the various GIS databases, or user-apparent GIS databases, stored by the GRT date center 12. Referring to FIG. 2 the specific arrangement by which the Backend Relational Database Management System 46 maintains, or can provide, a different GIS database, or apparent GIS database, for each of relief agency, e.g., each different client headquarters 16, is a design choice. The term "apparent GIS database" is used because the Backend Relational Database Management System 46 may be configured to maintain a plurality of records, each record having fields of, for example, location, date, damage type(s), damage quantity(ies), reporting agency(ies), authorized sharing agencies, a data quality indicator, and other situational facts such as, for example, ongoing armed conflict. To generate an updated map, such as the below-described SITUATIONAL MAP (G, A), where G is an index for geographical area and A is an index for the agency receiving the map, the Backend blocks 42, 44 and 46 may retrieve data for overlays representing all facts from the database that are within or associated with the G geographical area and are (a) authorized for the A agency to see and (b) preselected by the A agency for seeing. It will be understood that the "G" and "A" indices are only for purposes of describing a function of blocks 214, 216 and 218, in that the actual implementation of Backend blocks 42, 44 and 46 may have no such index.

Referring again to FIG. 5, block 214 incorporates the DAMAGE ASSESSMENT REPORT into the GRT database center 12, under control of the Backend Relational Database Management System 46 and then proceeds to block 216 to generate a new SITUATIONAL MAP (G, A), and to block 218 to transmit an UPDATE REPORT (G, A), using the same G and A indices to represent the geographical area(s) and agency(ies), respectively, to which the UPDATE REPORT will be sent.

The process by which the field sites 14 receive an UPDATE REPORT is largely a design choice. For example, referring to FIG. 4, each time a user logs in at block 102 and the site 14 transmits a "here I am" notice, the site 14 may receive all UPDATE REPORTS that the user is authorized to receive. Depending on the implementation, the user may be given a choice to see UPDATE REPORTS that have no information with the respect to the location of field site 14. A variation for the report block 218 of FIG. 5 is that the user would have to send a "check for updates" request, instead of automatically receiving the update. Still another variation is to send a "check for updates notice" to the persons listed as authorized users of agency's' field sites 14 by, for example, wireless e-mail. These and other implementations for the block 218 transmission of the UPDATE REPORTS to field sites 14 are readily performed by persons skilled in the above-listed pertinent arts.

Block 218 also sends UPDATE REPORTS to the relief agency(ies) at, for example, their respective client headquarter sites 16. This may be done by, for example, e-mail, with the e-mail having the UPDATE REPORT attached, or by an e-mail notice for the agency(ies) to log into their respective GIS databases and check for updates using, for example, the FIG. 2 viewer/web browser block 52. The process then goes to block 220 and ends.

Referring to FIG. 5, if block 210 determined that the DAMAGE ASSESSMENT REPORT was not sharable, blocks 212 followed by 222 through 226 are executed much the same as blocks 214 through 220, the only difference being that only one relief agency and one relief agency's field sites 14 receive the UPDATE REPORT.

Figure 7:
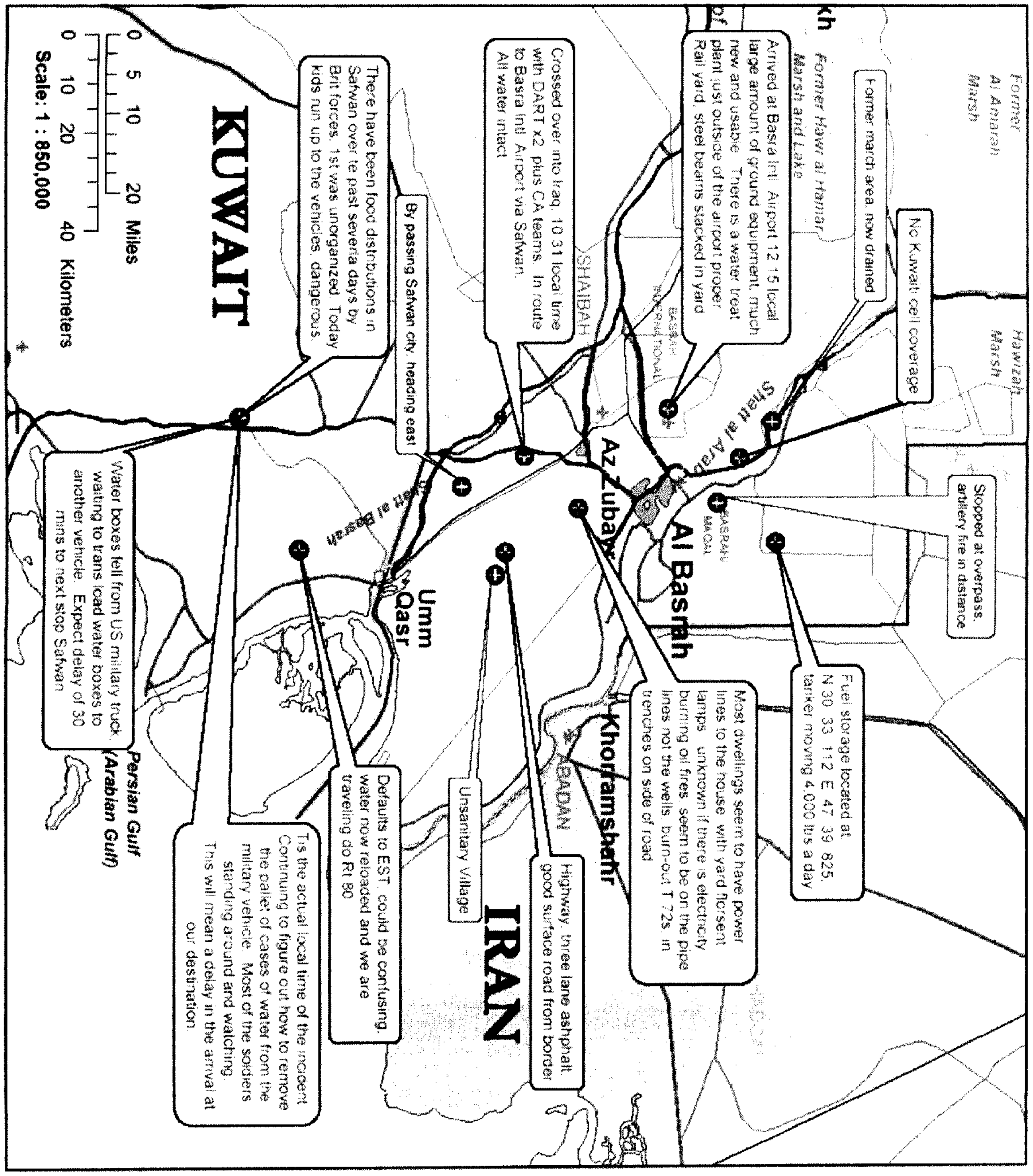
FIG. 7 is an example situational map all, or part of which, is displayed on the user's field unit.
Figure 8:
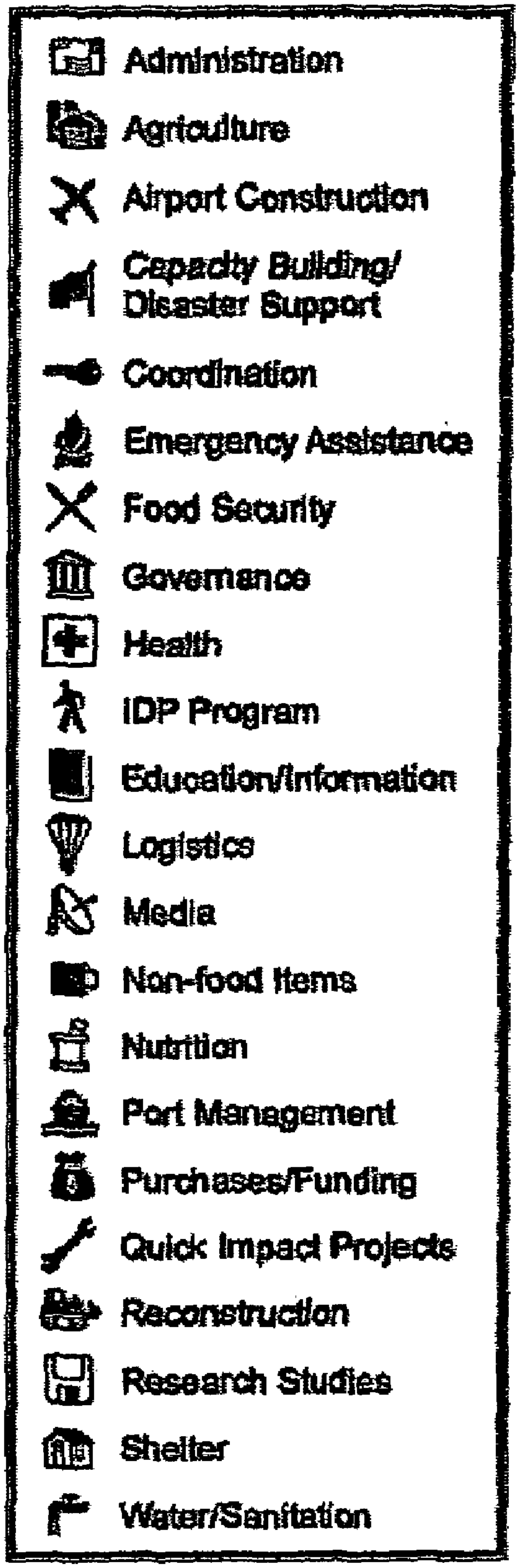
FIG. 8 is an example set of symbols for a real-time situational map.

FIG. 7 is an example display, either on the video display of the customer headquarters 16 or the video display of the field sites 14, as would be seen after receiving an UPDATE REPORT. The FIG. 7 example uses call-outs that describe, with words, situations at a plurality of geographical locations. FIG. 8 is an example of symbols for use in overlay maps displayed on the video display of the customer headquarters 16 or the video display of the field sites 14, either separate from in conjunction with call-outs as shown by FIG. 7.

While the present system has been disclosed with reference to certain preferred embodiments, these should not be considered limitations. One skilled in the art will readily recognize that variations of these embodiments are possible, each falling within the scope of the system, and as set forth in the claims below.

What is claimed is:

1. A method for damage assessment comprising:

providing a database having a plurality of damage characterization data and a geographical location associated with each;

providing a plurality of portable communication units in communication with said database, each having a display, a manual data entry mechanism, and a geolocation detector for generating a geolocation data based on an externally generated geolocation signal;

providing a plurality of subscribing party headquarter communication units in communication with said database;

associating a first of said portable communication units and a first of said plurality of subscribing party headquarter communication units with a first subscribing party and a second of said portable communication units and a second of said plurality of subscribing party headquarter communication units with a second subscribing party;

providing a sharing privilege data list identifying, for said first subscribing party, at least one of said first subscribing party and said second subscribing party authorized to receive damage assessment data from said first subscribing party;

generating said geolocation data at said first of said portable communication units based on a geolocation of said first of said portable communication units;

inputting a damage assessment data into said first of said portable communication units;

transmitting a damage assessment report from said first of said portable communication units to said database, said damage assessment report including data reflecting said damage assessment data, an identification data identifying said damage assessment report as being sent by said first of said portable communications units, and said geolocation data;

updating said database based on said damage assessment report;

communicating at least one data reflecting said damage assessment report to at least one of said second portable communication unit and said second of said plurality of subscribing party headquarter communication units if, and only if, second subscribing party is on said sharing privilege data list.

2. A method according to claim 1 further comprising communicating an update data to said first of said portable communication units reflecting said updating said database.

3. A method according to claim 1 further including:

updating said sharing privilege data list to said second subscribing party as a party authorized to receive damage assessment data from said first subscriber wherein said;

generating a new geolocation data at said first of said portable communication units based on a geolocation of said first of said portable communication units;

inputting a new damage assessment data into said first of said portable communication units;

transmitting a new damage assessment report from said first of said portable communication units to said database, said damage assessment report including data reflecting said new damage assessment data, an identification data identifying the damage assessment report as being sent by said first of said portable communications units, and said new geolocation data;

updating said database based on said new damage assessment report; and communicating said at least one data reflecting said new damage assessment report to said second portable communication unit based on said updated sharing privilege list.

4. A method according to claim 1 further including:

updating said sharing privilege data list to said second subscribing party as a party authorized to receive damage assessment data from said first subscriber wherein said;

generating a new geolocation data at said first of said portable communication units based on a geolocation of said first of said portable communication units;

inputting a new damage assessment data into said first of said portable communication units;

transmitting a new damage assessment report from said first of said portable communication units to said database, said damage assessment report including data reflecting said new damage assessment data, an identification data identifying the damage assessment report as being sent by said first of said portable communications units, and said new geolocation data;

updating said database based on said new damage assessment report; and communicating said at least one data reflecting said new damage assessment report to said second of said portable communication units based on said updated sharing privilege list.

5. A method according to claim 4, further comprising communicating said at least one data reflecting said new damage assessment report to said second of said subscribing party headquarter communication units based on said updating said sharing privilege list.

* * * * *